(12) United States Patent
Plobner et al.

(10) Patent No.: US 12,163,240 B2
(45) Date of Patent: Dec. 10, 2024

(54) ELECTROLYSIS CELL AND METHOD FOR PRODUCING THE ELECTROLYSIS CELL

(71) Applicant: Siemens Energy Global GmbH & Co. KG, Bayern (DE)

(72) Inventors: Roland Plobner, Bayern (DE); Alexander Spies, Kemnath (DE); Jochen Straub, Erlangen (DE)

(73) Assignee: Siemens Energy Global GmbH &Co. KG, Bayern (DE)

(*) Notice: Subject to any disclaimer, the term of this patent is extended or adjusted under 35 U.S.C. 154(b) by 413 days.

(21) Appl. No.: 17/629,374

(22) PCT Filed: Jun. 10, 2020

(86) PCT No.: PCT/EP2020/066091
§ 371 (c)(1),
(2) Date: Jan. 22, 2022

(87) PCT Pub. No.: WO2021/018459
PCT Pub. Date: Feb. 4, 2021

(65) Prior Publication Data
US 2022/0251718 A1    Aug. 11, 2022

(30) Foreign Application Priority Data
Jul. 30, 2019   (EP) .................... 19189067

(51) Int. Cl.
*C25B 9/23*    (2021.01)
*C25B 1/04*    (2021.01)
(Continued)

(52) U.S. Cl.
CPC .................. *C25B 9/23* (2021.01); *C25B 9/60* (2021.01); *C25B 11/032* (2021.01); *C25B 1/04* (2013.01);
(Continued)

(58) Field of Classification Search
None
See application file for complete search history.

(56) References Cited

U.S. PATENT DOCUMENTS

| 4,026,782 A | 5/1977 | Bouy et al. |
| 4,755,272 A * | 7/1988 | Plowman ............ H01M 8/2457 429/513 |

(Continued)

FOREIGN PATENT DOCUMENTS

| CN | 1853300 A | 10/2006 |
| CN | 107881528 A | 4/2018 |

(Continued)

OTHER PUBLICATIONS

PCT International Search Report and Written Opinion of International Searching Authority mailed Sep. 14, 2020 corresponding to PCT International Application No. PCT/EP2020/066091 filed Jun. 10, 2020.

*Primary Examiner* — Harry D Wilkins, III
(74) *Attorney, Agent, or Firm* — Wolter Van Dyke Davis, PLLC

(57) ABSTRACT

An electrolysis cell with a cell frame and to a method for producing an electrolysis cell, wherein the cell frame has a stepped inner profile. The inner profile has at least one support surface for receiving a planar component in the cell frame, and the support surface has a recess for a seal. A seal is first placed in the recess, and a membrane-electrode unit, a first gas diffusion layer, and an electrically conductive top layer are then introduced into the cell frame. The cell frame is then rotated, and a second gas diffusion layer is applied. The electrolysis cell produced in this manner includes the cell frame with the seal and the different layers.

15 Claims, 3 Drawing Sheets

(51) Int. Cl.
*C25B 9/60* (2021.01)
*C25B 9/77* (2021.01)
*C25B 11/032* (2021.01)
*H01M 8/0273* (2016.01)
*H01M 8/1004* (2016.01)

(52) U.S. Cl.
CPC ............ *C25B 9/77* (2021.01); *H01M 8/0273* (2013.01); *H01M 8/1004* (2013.01)

(56) References Cited

U.S. PATENT DOCUMENTS

| | | | | |
|---|---|---|---|---|
| 6,080,503 | A * | 6/2000 | Schmid | H01M 8/242 |
| | | | | 429/483 |
| 6,117,287 | A | 9/2000 | Molter et al. | |
| 6,613,215 | B2 * | 9/2003 | Molter | C25B 9/73 |
| | | | | 204/266 |
| 9,920,440 | B2 * | 3/2018 | Gashi | H01M 8/0297 |
| 2002/0068208 | A1 | 6/2002 | Dristy et al. | |
| 2004/0040862 | A1 * | 3/2004 | Kosek | C01B 13/0255 |
| | | | | 205/637 |
| 2004/0151969 | A1 | 8/2004 | Joos et al. | |
| 2005/0014056 | A1 | 1/2005 | Zuber | |
| 2006/0046131 | A1 | 3/2006 | Frank et al. | |
| 2007/0215461 | A1 | 9/2007 | Zuber | |
| 2016/0115603 | A1 * | 4/2016 | Gashi | C25B 15/08 |
| | | | | 204/255 |
| 2017/0088959 | A1 * | 3/2017 | Abouatallah | H01M 8/023 |
| 2018/0179647 | A1 * | 6/2018 | Ukai | C25B 1/04 |
| 2020/0194816 | A1 * | 6/2020 | Jeong | H01M 8/2483 |
| 2023/0332306 | A1 * | 10/2023 | Corp | B32B 9/007 |

FOREIGN PATENT DOCUMENTS

| | | |
|---|---|---|
| DE | 715873 C | 1/1942 |
| DE | 2533728 A1 | 2/1976 |
| DE | 102015100737 A1 | 7/2016 |
| JP | S5144571 A | 4/1976 |
| JP | 2018028134 A | 2/2018 |
| WO | 02081780 A1 | 10/2002 |
| WO | 2005006473 A2 | 1/2005 |

* cited by examiner

ELECTROLYSIS CELL AND METHOD FOR PRODUCING THE ELECTROLYSIS CELL

CROSS REFERENCE TO RELATED APPLICATIONS

This application is the US National Stage of International Application No. PCT/EP2020/066091 filed 10 Jun. 2020, and claims the benefit thereof. The International Application claims the benefit of European Application No. EP19189067 filed 30 Jul. 2019. All of the applications are incorporated by reference herein in their entirety.

FIELD OF INVENTION

The invention relates to an electrolysis cell and a process for producing the electrolysis cell.

BACKGROUND OF INVENTION

An electrolyzer is an apparatus which brings about a transformation of material with the assistance of an electric current (electrolysis). Corresponding to the wide variety of different electrolyses, there are also many electrolyzers, for example an electrolyzer for hydrogen electrolysis.

Present-day considerations are directed at storing the excess energy from renewable energy sources at times when there is much sun and much wind, i.e. at times of above-average solar power or wind power generation. Storage can be effected, in particular, using electrochemical cells, in particular fuel cells or electrolysis cells. In particular, energy can be stored by production of materials of value. One material of value can, in particular, be hydrogen which is produced using water electrolyzers. What is known as EE gas, for example, can be produced by means of the hydrogen.

Here, a (hydrogen electrolysis) electrolyzer firstly produces hydrogen using electric energy, in particular from wind energy or solar energy. The hydrogen can then be used together with carbon dioxide in a Sabatier process to produce methane. The methane can then, for example, be fed into an existing natural gas network and thus makes it possible to store and transport energy to the consumer and can in this way decrease the load on the electricity grid.

As an alternative thereto, the hydrogen produced by the electrolyzer can also be used further directly, for example for a fuel cell.

In an electrolyzer for hydrogen electrolysis, water is dissociated into hydrogen and oxygen. In a PEM electrolyzer, distilled water is typically introduced as starting material at the anode side and dissociated into hydrogen and oxygen at a proton exchange membrane (PEM). Here, the water is oxidized to oxygen at the anode. The protons pass through the proton exchange membrane. On the cathode side, the protons recombine to form hydrogen.

A typical structure of a PEM electrolyzer comprises a first gas diffusion layer and a second gas diffusion layer. The proton exchange membrane (PEM) is arranged between the gas diffusion layers. All layers are arranged in a cell frame. The arrangement of the gas diffusion layers in the cell frames at present disadvantageously has to be carried out with great accuracy in order to produce a reliably functioning electrolysis cell. This makes the production of the components and also assembly expensive.

DE 25 33 728 A1 discloses an electrolysis cell for electrolysis of a solution of alkali metal salts. The electrolysis cell comprises bipolar electrodes arranged next to one another and at least one outer frame enclosing at least one chamber of the electrolysis zone.

Further electrochemical cells having sealing cell frames are described, for example, in U.S. Pat. No. 6,117,287 A and US 2002/068208 A1. In CN 107 881 528 A, a process for producing a PEM membrane electrode assembly is described.

SUMMARY OF INVENTION

It is an object of the invention to provide an electrolysis cell having a cell frame and a process for producing the electrolysis cell which simplifies the construction of the electrolysis cell and the process for producing the electrolysis cell, in particular for large cell areas, and makes the operation of the electrochemical cell very reliable.

The object is achieved by an electrolysis cell as claimed and a process as claimed.

The cell frame for an electrochemical cell according to the invention, in particular for a fuel cell or an electrolysis cell, has a step-like interior profile. The step-like interior profile comprises at least one support surface for accommodating a planar component in the cell frame. The support surface has a recess for a seal.

An electrolysis cell according to the invention has a cell frame having a step-like interior profile. The step-like interior profile comprises at least one support surface for accommodating a planar component in the cell frame. The support surface has a recess for a seal. The electrolysis cell further comprises a seal which is arranged in the recess of the support surface. The electrolysis cell further comprises a membrane electrode assembly which covers the support surface of the cell frame and the seal. It also has a first gas diffusion layer which adjoins a first side of the membrane electrode assembly. It likewise has a second gas diffusion layer which adjoins a second side of the membrane electrode assembly. The electrolysis cell also has an electrically conductive closure layer which lies on the first gas diffusion layer and is fixed to the cell frame.

Owing to the step-like interior profile, the first gas diffusion layer projects beyond the boundaries of the second gas diffusion layer. The size of the gap between cell frame and membranes, or gas diffusion layers, can therefore advantageously be greater. This advantageously assists and shortens the assembly process. Furthermore, the exterior contours of the membranes and/or gas diffusion layers can advantageously be chosen freely. It is merely necessary for the exterior contours of the membranes and of the first gas diffusion layer to project beyond the seal, so that satisfactory support of the seal is ensured. The seal advantageously also ensures a sealing function between the cathode and the anode side of the electrolysis cell.

In an advantageous embodiment and further development of the invention, the support surface is essentially sheet-like. In other words, the support surface is flat, i.e. not curved. The flat surface is merely interrupted by the recess. The membranes, in particular as an MEA (membrane electrode assembly), and the gas diffusion layers can advantageously lie flat and thus with intimate contact on the support surface. A high freedom from leaks is advantageously ensured in this way.

In a further advantageous embodiment and further development of the invention, the cell frame consists of one workpiece. In other words, it is not made up of a plurality of components but is instead produced from one workpiece. The cell frame can, in particular, comprise a polymer. It can, in particular, be cast from this polymer. As an alternative, it is likewise conceivable for the cell frame to be produced from sheet-like raw materials by mechanical working. The cell frame advantageously comprises an electrically insulating material.

In a further advantageous embodiment and further development of the invention, the cell frame encloses an area of at least 3000 cm$^2$.

In a further advantageous embodiment and further development of the invention, the membrane electrode assembly, the first gas diffusion layer and the second gas diffusion layer each have a size which is smaller than the area enclosed by the interior profile of the cell frame. Particular advantage is given to one of the gas diffusion layers having an area greater than the other gas diffusion layer. They thus have different sizes. These layers can be laid into the interior profile of the cell frame. They thus do not lie on top of the cell frame but instead are arranged in the area enclosed by the interior profile of the cell frame. These layers can thus advantageously be arranged in the interior profile of the cell frame in such a way that the height of the layers does not exceed the height of the cell frame. In other words, an arrangement of the layers in the cell frame fills the interior of the cell frame but the layers do not project beyond the cell frames.

In a further advantageous embodiment and further development of the invention, the electrically conductive closure layer has a size which is greater than the area enclosed by the interior profile of the cell frame. In other words, the electrically conductive closure layer thus lies on the cell frame. This closure layer can thus advantageously easily be mechanically fastened to an upper side or underside of the cell frame. Fastening of this layer in the interior profile of the cell frame is advantageously not necessary.

The statement that the support surface has a recess for a seal means, in other words, that, in particular, the recess for the seal is not arranged at the periphery of the support surface. The recess thus does not have any lateral boundaries coinciding with those of the support surface. The recess is accommodated within the support surface. This advantageously results in a seal being able to be arranged within the support surface so as not to be able to slip, i.e., in other words, being positionally fixed. A first seal is particularly advantageously firmly connected to the cell frame. A sealing function is effected not as hitherto by a small gap size between the cell frame and the membranes and/or gas diffusion layers but instead by a seal arranged in the support surface of the cell frame.

The process of the invention for producing an electrolysis cell comprises a plurality of steps. Firstly, a cell frame is provided. The cell frame has a step-like interior profile. The step-like interior profile has at least one support surface for accommodating a planar component in the cell frame. The support surface comprises a recess for a seal. In a next step, a seal is placed in the recess of the support surface. If a cell frame having a firmly connected first seal is used, this step can be omitted. A membrane electrode assembly is subsequently laid on the support surface, with the membrane electrode assembly covering the support surface of the cell frame and the seal. A first gas diffusion layer is subsequently laid on a first side of the membrane electrode assembly. An electrically conductive closure layer is subsequently laid on the first gas diffusion layer and the cell frame. The closure layer is mechanically fixed to the cell frame. The cell frame is subsequently rotated together with the seal, the membrane electrode assembly, the first gas diffusion layer and the closure layer in such a way that the closure layer is now arranged at the bottom and the membrane catalyst layer is arranged at the top. Bottom and top are here to be interpreted as relative to the field of gravity of the earth. Bottom thus means that this layer is arranged closer to the earth than a layer which is arranged at the top. A second gas diffusion layer is subsequently arranged on a second side of the membrane electrode assembly in the cell frame.

The use of the step-like interior profile of the cell frame advantageously firstly allows the seal, the membrane electrode assembly, the first gas diffusion layer and the electrically conductive closure layer to be arranged by simple laying in the cell frame. As a result of the subsequent rotation, mounting of the second gas diffusion layer on the membrane electrode assembly is advantageously made significantly easier. During rotation, the membrane electrode assembly is supported by the first gas diffusion layer and the closure layer and clamped in the cell frame. The support advantageously ensures that the membrane electrode assembly does not slip and thus remains arranged in such a way that the seals are covered. The second gas diffusion layer can subsequently be simply laid on the membrane electrode assembly. Simple equipping of the cell frame with the layers is made possible even for very large cell areas with a small outlay by the rotation.

In an advantageous embodiment of the invention, the cell frame and the electrically conductive closure layer are sealed from one another.

In order to obtain a cell stack, a plurality of electrolysis cells are placed on top of one another, sealed from one another and pressed together.

In an advantageous embodiment and further development of the invention, the mechanical fixing of the closure layer to the cell frame is effected by means of a screw connection, riveting or by a clamp.

BRIEF DESCRIPTION OF THE DRAWINGS

Further features, properties and advantages of the present invention may be derived from the following description with reference to the accompanying figures. The figures schematically show.

DETAILED DESCRIPTION OF INVENTION

Figure 1:
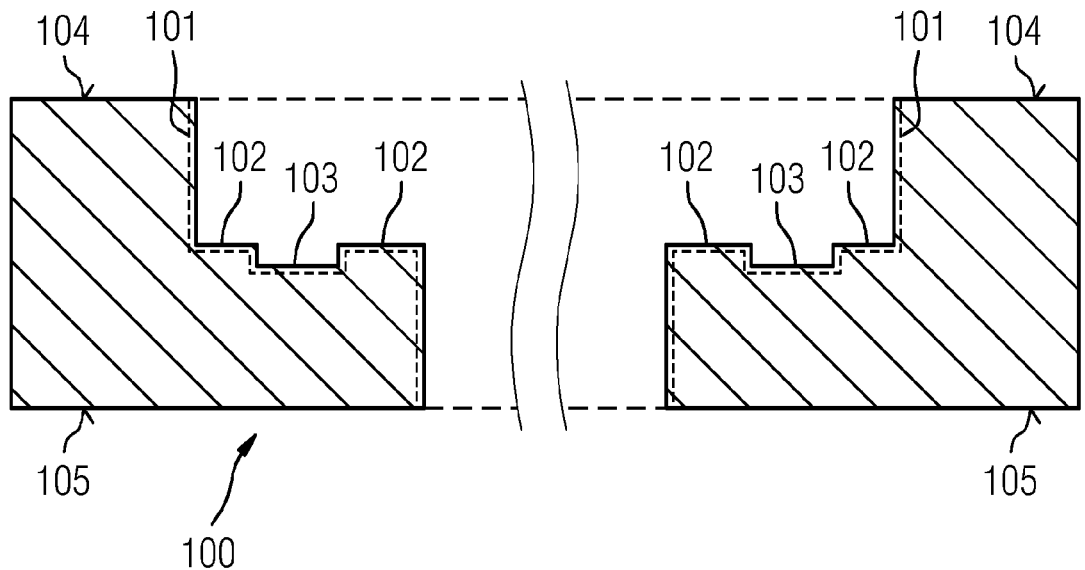
FIG. 1 a section through a cell frame for an electrolysis cell.

FIG. 1 shows a section through a cell frame 100 for an electrochemical cell, in particular a fuel cell or an electrolysis cell, having a step-like interior profile 101. The step-like interior profile 101 has a support surface 102. A recess 103 is arranged in the support surface 102. The cell frame 100 has an upper side 104 of the frame and a frame underside 105.

Figure 2:
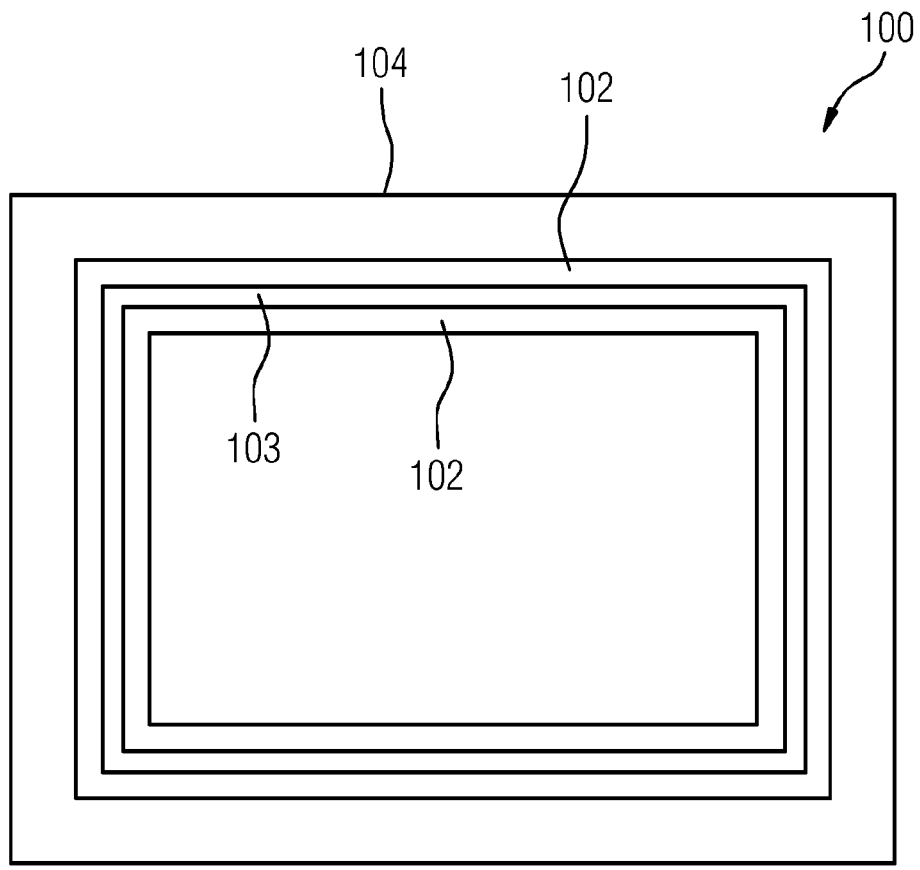
FIG. 2 a plan view of a cell frame for an electrolysis cell.

FIG. 2 shows a plan view of the cell frame 100 having a step-like interior profile 101. In this example, the cell frame 100 is rectangular. However, it is likewise conceivable for it to have a round or oval shape, or further technically purposeful shapes.

In this working example, the construction of an electrolysis cell is described. However, it is likewise possible, as an alternative, to use the cell frame 100 for constructing a fuel cell.

At the commencement of the construction of the electrolysis cell, the cell frame 100 is arranged in the gravitational field of the earth in such a way that the upper side 104 of the frame is oriented at the top, i.e. away from the earth, and the frame underside 105 is oriented at the bottom, i.e. toward the earth. This is shown in FIG. 1. The cell frame 100 is made from one workpiece. In a first assembly step, a seal 6 is placed in the recess 103. This seal 6 can be configured as sealing strip, as applied seal or as sealing ring. The seal 6 typically comprises materials such as PTFE, silicone, fluororubber or further materials from the group of elastomers.

Figure 3:
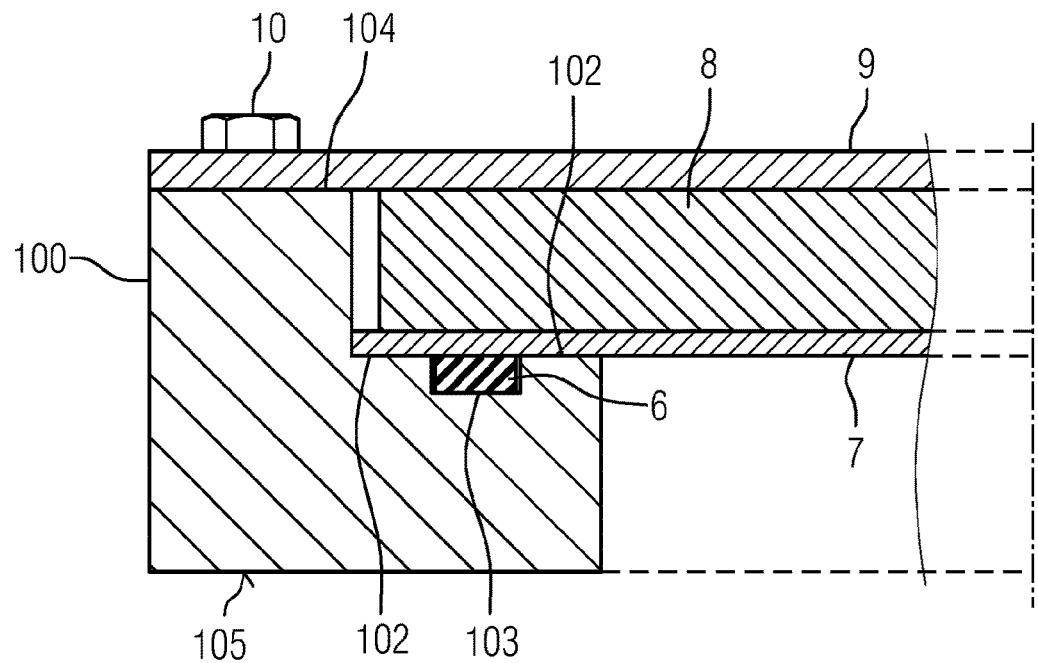
FIG. 3 a first section through a cell frame with layers and mechanical fixing during assembly.

FIG. 3 shows the cell frame 100 in an intermediate state of assembly. The seal 6 is arranged in the recess 103. A membrane electrode assembly 7 is subsequently placed on the support surface 102. The membrane electrode assembly 7 has a size which virtually completely fills the cell frame. The size of the membrane electrode assembly 7 should advantageously be chosen at least in such a way that the membrane electrode assembly 7 reliably and within any possible tolerance extends beyond the seal 6, as can be seen in FIG. 3. A first gas diffusion layer 8 is subsequently laid from the top onto the membrane electrode assembly 7. The size of the first gas diffusion layer 8 should be made at least so large that it projects beyond the area enclosed by the seal. In other words, the gas diffusion layer 8 lies indirectly on the step of the step-like interior profile 101. Both the size of the membrane electrode assembly 7 and that of the first gas diffusion layer 8 should be chosen so that they are not larger than the area enclosed by the cell frame 100. Advantageously, a seal to effect sealing between cell frame 100 and electrically conductive closure layer is then introduced. If desired, the seal can already be part of the cell frame 100 or the electrically conductive closure layer 9. An electrically conductive closure layer 9 is subsequently laid on the first gas diffusion layer 8. This electrically conductive closure layer 9 is fixed firmly to the cell frame 100 using a mechanical fixing device, in this example a screw 10. FIG. 3 shows how the cell frame is provided with the different layers 7, 8, 9, the seal 6 and the screw connection 10 at this point in time during assembly. In a next step, the cell frame 100 is rotated together with the seal 6, the membrane electrode assembly 7, the first gas diffusion layer 8 and the closure layer 9.

Figure 4:
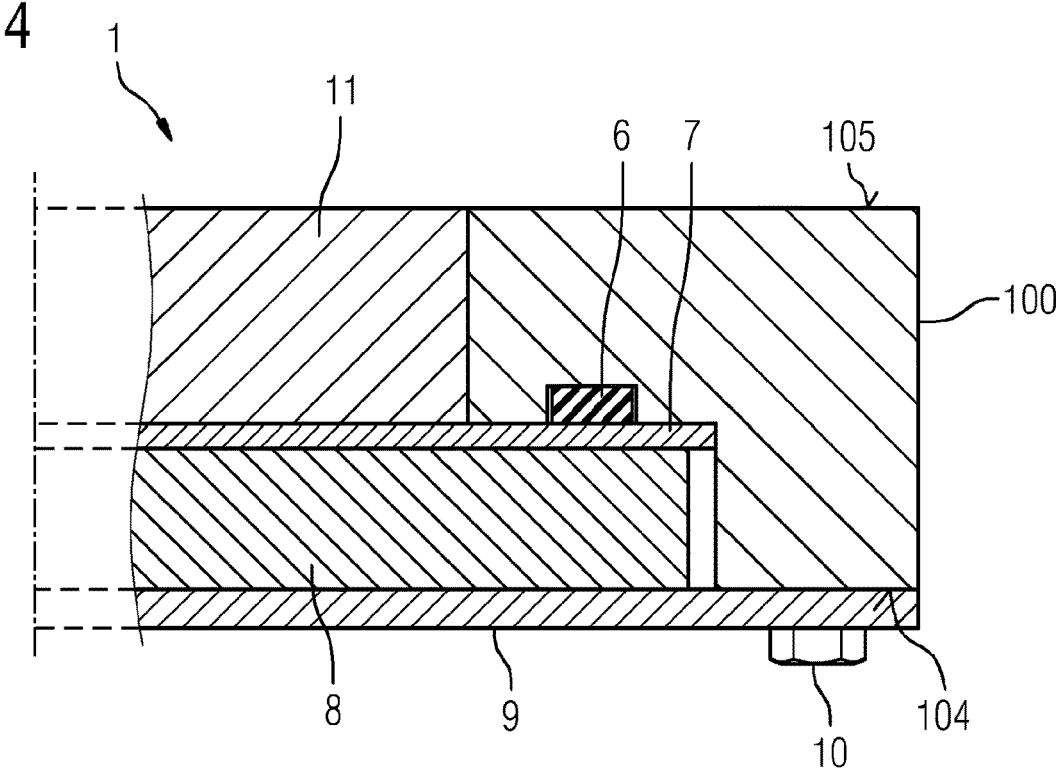
FIG. 4 a section through an electrolysis cell with cell frame.

FIG. 4 shows the cell frame 100 after it has been rotated. The upper side 104 of the frame is now arranged at the bottom, and the frame underside 105 is now arranged at the top. In other words, viewed in the gravitational field of the earth, the frame underside 105 is now arranged further away from the earth than the upper side 104 of the frame. In a next step, a second gas diffusion layer 11 is laid on the membrane electrode assembly 7. The membrane electrode assembly 7 now directly adjoins the second gas diffusion layer 11 on one side. On the other side, the membrane electrode assembly 7 directly adjoins the first gas diffusion layer 8. The electrolysis cell 1 which has been assembly in this way can then be stacked together with further electrolysis cells 1 to form a stack. The electrolysis cells are here sealed from one another. The rotation of the half-finished cell after the intermediate state of assembly in FIG. 3 advantageously allows simple mounting of the second gas diffusion layer 11 for large cell frame areas of at least 3000 cm$^2$. The size of the membrane electrode assembly 7 should merely be selected so that it covers at least the seal 6 but is smaller than the interior area of the cell frame. The membrane electrode assembly 7 is supported by the first gas diffusion layer 8 and secured against slipping by clamping. This allows faster and more efficient mounting of the membrane electrode assembly 7, with the freedom from leaks between a first cell half, in which the first gas diffusion layer 8 is arranged, and a second cell half, in which the second gas diffusion layer 11 is arranged, being reliably ensured at the same time.

Figure 5:
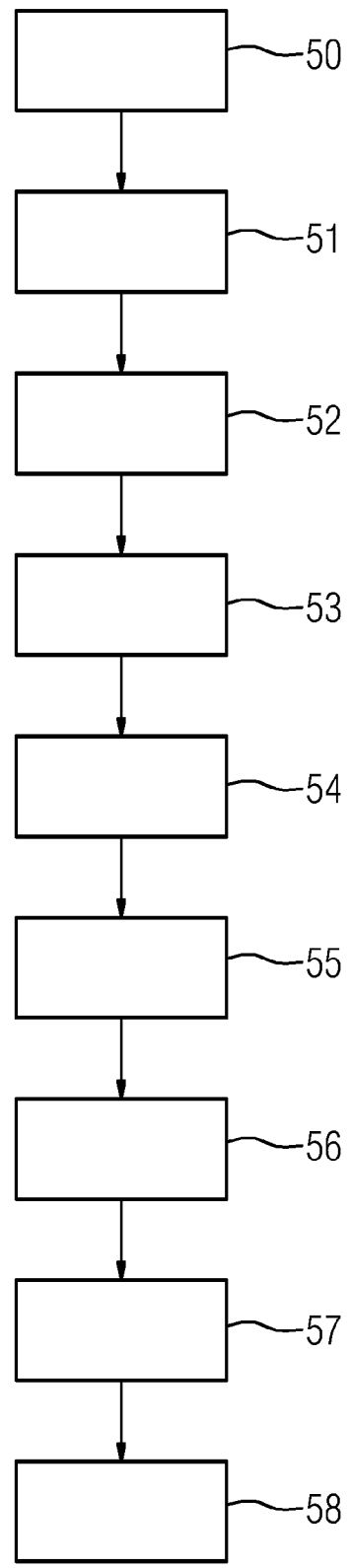
FIG. 5 a flow diagram of the production process for an electrolysis cell.

FIG. 5 schematically shows a flow diagram of the assembly process comprising the various steps. Firstly, the cell frame 100 is provided 50. The seal 6 is subsequently laid 51 in the recess 103. Step 51 can be omitted when the seal has already been configured as part of the cell frame. The membrane electrode assembly is then placed in the cell frame 52. This is followed by laying of the first gas diffusion layer 8 on the membrane electrode assembly 7 in a step 53. A seal can now be laid in the cell frame. This step can be omitted when the seal is already part of the cell frame 100 or of the closure layer 9. In the subsequent step 55, a closure layer 9 is laid on the first gas diffusion layer 8. Finally, the closure layer 9 is mechanically fixed to the cell frame 100 in the step 56. The cell frame 100 together with the layers 7, 8, 9 is subsequently rotated in step 57. A second gas diffusion layer 11 is subsequently applied to the membrane electrode assembly 7 in step 58.

The invention claimed is:

1. An electrolysis cell comprising:
   a cell frame, wherein the cell frame comprises a step-like interior profile, wherein the step-like interior profile comprises a support surface for accommodating a planar component in the cell frame, wherein the support surface comprises a recess for a seal,
   a first seal which is arranged in the recess of the support surface,
   a membrane electrode assembly which covers the support surface of the cell frame and the seal,
   a first gas diffusion layer which adjoins a first side of the membrane electrode assembly,
   a second gas diffusion layer which adjoins a second side of the membrane electrode assembly,
   an electrically conductive closure layer which lies on the first gas diffusion layer and is fixed to the cell frame, and
   a mechanical fixing device configured to mechanically fix the electrically conductive closure layer to the cell frame,
   wherein exterior contours of the membrane electrode assembly and the first gas diffusion layer project beyond the seal.

2. The electrolysis cell as claimed in claim 1,
   wherein the membrane electrode assembly, the first gas diffusion layer and the second gas diffusion layer each comprise a size which is smaller than an area enclosed by the interior profile of the cell frame.

3. The electrolysis cell as claimed in claim 1,
   wherein the electrically conductive closure layer comprises a size which is greater than an area enclosed by the interior profile of the cell frame.

4. The electrolysis cell as claimed in claim 1,
   wherein the cell frame consists of one workpiece.

5. The electrolysis cell as claimed in claim 1,
   wherein the cell frame encloses an area of at least 3000 cm$^2$.

6. The electrolysis cell as claimed in claim 5,
   wherein the cell frame comprises an electrically insulating material.

7. The electrolysis cell as claimed in claim 1,
   wherein the cell frame is electrically insulating.

8. The electrolysis cell as claimed in claim 1, wherein the first seal is connected to the cell frame in the recess.

9. The electrolysis cell as claimed in claim 1, wherein a second seal is arranged between a frame upper side and the electrically conductive closure layer.

10. The electrolysis cell as claimed in claim 1, wherein the mechanical fixing device comprises a screw that threads into the cell frame.

11. The electrolysis cell as claimed in claim 1, wherein when the second gas diffusion layer is uncompressed, the second gas diffusion layer does not project beyond the cell frame.

12. A process for producing an electrolysis cell, comprising:
- providing a cell frame, where the cell frame comprises a step-like interior profile, the step-like interior profile comprises a support surface for accommodating a planar component in the cell frame and the support surface comprises a recess for a seal,
- laying of the seal into the recess of the support surface,
- laying of a membrane electrode assembly on the support surface, where the membrane electrode assembly covers the support surface of the cell frame and the seal,
- laying of a first gas diffusion layer on a first side of the membrane electrode assembly, where exterior contours of the membrane electrode assembly and the first gas diffusion layer project beyond the seal,
- laying of an electrically conductive closure layer on the first gas diffusion layer and the cell frame,
- mechanical fixing of the electrically conductive closure layer to the cell frame via a fastener,
- rotating the cell frame together with the seal, the membrane electrode assembly, the first gas diffusion layer and the electrically conductive closure layer in such a way that the electrically conductive closure layer is now arranged at a bottom and the membrane electrode assembly is arranged at a top,
- applying a second gas diffusion layer to a second side of the membrane electrode assembly in the cell frame, and
- clamping of the layers in the cell frame.

13. The process as claimed in claim 12, wherein the mechanical fixing of the electrically conductive closure layer to the cell frame is effected by a screw connection, riveting or by a clamp.

14. The process as claimed in claim 12, wherein the fastener comprises a screw that threads into the cell frame.

15. An electrolysis cell comprising:
- a cell frame, wherein the cell frame comprises a step-like interior profile, wherein the step-like interior profile comprises a support surface for accommodating a planar component in the cell frame, wherein the support surface comprises a recess for a seal,
- a first seal which is arranged in the recess of the support surface,
- a membrane electrode assembly which covers the support surface of the cell frame and the seal,
- a first gas diffusion layer which adjoins a first side of the membrane electrode assembly,
- a second gas diffusion layer which adjoins a second side of the membrane electrode assembly, and
- an electrically conductive closure layer which lies on the first gas diffusion layer and is fixed to the cell frame,
- wherein exterior contours of the membrane electrode assembly and the first gas diffusion layer project beyond the seal, and
- wherein when the second gas diffusion layer is uncompressed, the second gas diffusion layer does not project beyond the cell frame.

* * * * *